(12) United States Patent
Lee

(10) Patent No.: US 8,428,612 B2
(45) Date of Patent: Apr. 23, 2013

(54) APPARATUSES, SYSTEMS, AND METHODS FOR PRIORITIZED LOAD BALANCING

(75) Inventor: Anthony Lee, San Diego, CA (US)

(73) Assignee: Via Telecom, Inc., San Diego, CA (US)

( * ) Notice: Subject to any disclaimer, the term of this patent is extended or adjusted under 35 U.S.C. 154(b) by 393 days.

(21) Appl. No.: 12/792,917

(22) Filed: Jun. 3, 2010

(65) Prior Publication Data

US 2011/0009126 A1 Jan. 13, 2011

Related U.S. Application Data

(60) Provisional application No. 61/224,298, filed on Jul. 9, 2009, provisional application No. 61/225,225, filed on Jul. 14, 2009.

(51) Int. Cl.
*H04W 72/00* (2009.01)

(52) U.S. Cl.
USPC .......................................................... 455/453

(58) Field of Classification Search ................... 455/453
See application file for complete search history.

(56) References Cited

U.S. PATENT DOCUMENTS

| 2005/0059399 | A1* | 3/2005 | Raval et al. | 455/436 |
| 2006/0084443 | A1* | 4/2006 | Yeo et al. | 455/449 |
| 2006/0251023 | A1* | 11/2006 | Choi | 370/331 |
| 2009/0247161 | A1* | 10/2009 | Pani et al. | 455/435.3 |
| 2009/0270104 | A1* | 10/2009 | Du et al. | 455/436 |
| 2011/0237259 | A1* | 9/2011 | Dimou et al. | 455/437 |

* cited by examiner

*Primary Examiner* — Nathan Mitchell
(74) *Attorney, Agent, or Firm* — McClure, Qualey & Rodack, LLP

(57) ABSTRACT

A mobile communication device for prioritized load balancing is provided. In the mobile communication device, a wireless module receives data communication services and a broadcast message from a first service network. Also, a controller determines whether the broadcast message has load balancing information for the first service network and a second service network, and in response to the broadcast message having the load balancing information, generates a random number and determines whether the random number belongs to a restricted priority level according to the load balancing information. The controller further suspends a reselection from the first service network to the second service network, in response to the random number belonging to the restricted priority level.

18 Claims, 4 Drawing Sheets

APPARATUSES, SYSTEMS, AND METHODS FOR PRIORITIZED LOAD BALANCING

CROSS REFERENCE TO RELATED APPLICATIONS

This Application claims the benefit of U.S. Provisional Application No. 61/224,298, filed on Jul. 9, 2009, the entirety of which is incorporated by reference herein, and this Application also claims the benefit of U.S. Provisional Application No. 61/225,225, filed on Jul. 14, 2009, the entirety of which is incorporated by reference herein.

BACKGROUND OF THE INVENTION

1. Field of the Invention

The invention generally relates to load balancing in wireless communications, and more particularly, to prioritized load balancing using priority levels of users.

2. Description of the Related Art

Due to communication technology advancements in recent years, several mobile communication technologies, such as Wideband Code Division Multiple Access (W-CDMA) technology, 1×Code Division Multiple Access 2000 (1×CDMA 2000) technology, 1×Evolution-Data Optimized (1×EVDO) technology (or otherwise called a 1×High Rate Packet Data (1×HRPD) technology), and Long Term Evolution (LTE) technology, etc., have been developed to provide high data communicating rates. In a service network, an access network (AN) is equipped with an antenna, serving as a cell of the mobile communication system. An access terminal (AT) transceives radio signals from the AN to obtain data communication services. The AN may be connected to a mobile switching system which is further connected to a telephone/data network. The AN converts RF signals to telephonic/data signals, and vice versa, to allow communication between the AT and other communication terminals somewhere else in the telephone/data network. The coverage areas of multiple ANs may overlap in order to ensure that an AN is selected to provide communication services to the AT. Since there are multiple ANs with concurrent required services, the mobile switching system must determine which AT will provide services to the AT. In a conventional mobile communication system, the AN chosen, is determined by comparing the signal strength of signals between the AT and each involved AN. Generally, the AN with the strongest signal strength is assigned to provide communication services to the AT.

However, there may be situations where many ATs flock into the coverage of an AN, or many ATs flock from one service network to another, or all ATs in the coverage of an AN request high bandwidth usage from the AN, which cause an overload of the flocked AN or the flocked service network, and results in rejected requests to any new ATs in the same area. Thus, in order to avoid ping-pong effect and increase the system stability of the service networks, it is preferred to have the loading of a service network evenly distributed among the ANs and limit the amount of ATs that are transferred to another service network. Meanwhile, it is also desirable to serve all ATs in such a way that good performance can be achieved for the ATs and the service network.

BRIEF SUMMARY OF THE INVENTION

Accordingly, embodiments of the invention provide apparatuses, systems, and methods for prioritized load balancing. In one aspect of the invention, a mobile communication device for prioritized load balancing is provided. The mobile communication device comprises a wireless module and a controller. The wireless module receives data communication services from a first service network. The controller generates a random number and determines whether the random number belongs to a restricted priority level. The controller further suspends a reselection from the first service network to the second service network in response to the random number belonging to the restricted priority level.

In another aspect of the invention, a prioritized load balancing method for a mobile communication device connected to a first service network is provided. The prioritized load balancing method comprises receiving data communication services from the first service network, and generating a random number and determining whether the random number belongs to a restricted priority level, and suspending a reselection from the first service network to a second service network, in response to the random number belonging to the restricted priority level.

In another aspect of the invention, a mobile communication system for prioritized load balancing is provided. The mobile communication system comprises a first service network and a mobile communication device. The first service network provides data communication services according to a first communication protocol. The mobile communication device receives the data communication services from the first service network, and generates a random number and determines whether the random number belongs to a restricted priority level. The mobile communication device further suspends a reselection from the first service network to the second service network, in response to the random number belonging to the restricted priority level.

Thus, in the situations where a single service network with overlapped coverage of multiple ANs, the number of ATs transferring between the ANs may be controlled. Additionally, in the situation where multiple service networks operating with different mobile communication technologies may have overlapped coverage, operator of a service network may transfer only a certain percentage of the ATs in its coverage to another service network when the system loading gets heavy, so that the ping-pong effect may be avoided to keep the operating stability of the service networks. Other aspects and features of the invention will become apparent to those with ordinary skill in the art upon review of the following descriptions of specific embodiments of the mobile communication devices, the mobile communication systems, and the prioritized load balancing methods.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
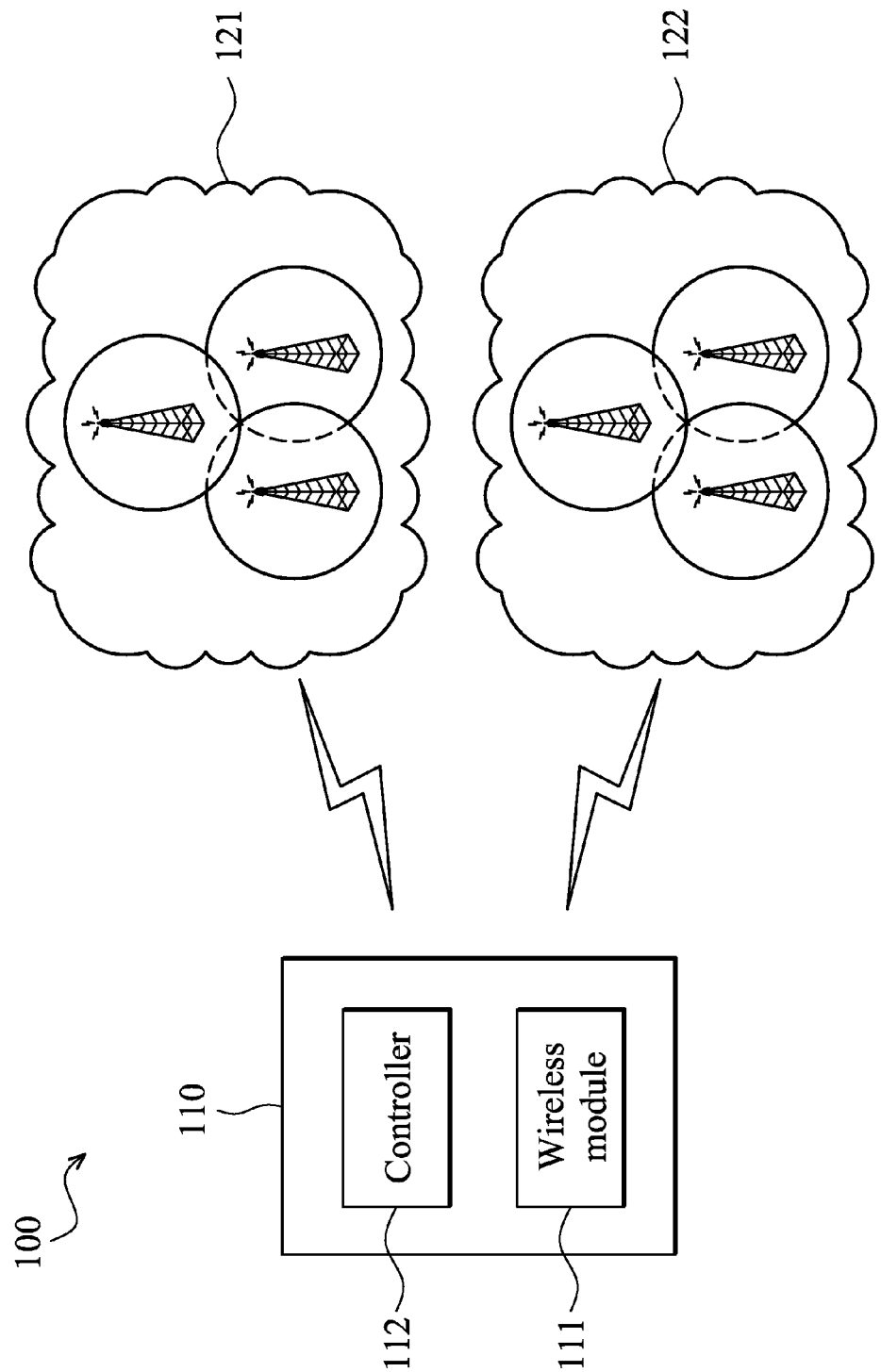
FIG. 1 is a block diagram illustrating the mobile communication system according to an embodiment of the invention.

FIG. 1 is a block diagram illustrating the mobile communication system according to an embodiment of the invention. In the mobile communication system 100, there are two service networks, i.e. the first service network 121 and the second service network 122, providing data communication services according to a first communication protocol and a second communication protocol, respectively. In this embodiment, the first communication protocol is in compliance with the 1×HRPD technology, and the second communication protocol is in compliance with the LTE technology. After being powered on, the mobile communication device 110 supporting both of the first communication protocol and the second communication protocol is wirelessly connected to the first service network 121 for receiving data communication services from the first service network 121. The mobile communication device 110 comprises a wireless module 111 and a controller 112. After connecting to the first service network 121, the mobile communication device 110 receives a broadcast message from the first service network 121 via the wireless module 111. It is noted that the first service network 121, unlike the conventional 1×HRPD systems, may include load balancing information in the broadcast message when system loading gets heavy. The load balancing information may be included in the "NeighborRAT" record of the broadcast message as shown in Table 1 below:

TABLE 1

The content of the "NeighborRAT" record

| Field | Length (bits) |
|---|---|
| PreChannelPriorityIncluded | 1 |
| ServingHRPDPriority | 1 or 3 |
| ServingHRPDThreshold | 0 or 5 |
| RxLevMinCommon | 0 or 7 |
| ThresholdCommon | 0 or 5 |
| MaxReselectionTimerIncluded | 1 |
| MaxReselectionTimer | 0 or 4 |
| SearchBackOffTimerIncluded | 1 |
| SearchBackOffTimer | 0 or FFS |
| PerChannelMBIncluded | 1 |
| MeasurementBandwidthCommon | 0 or 3 |
| LoadBalanceIncluded | 1 |
| ClassBlocked | 0 or 10 |
| TimeBlocked | 0 or 4 |
| NumEUTRAFrequencies | 1 |

The "NeighborRAT" record comprises information of reselection to the neighboring radio access technologies, wherein the "LoadBalanceIncluded", "ClassBlocked", and "TimeBlocked" fields are used for the load balancing information. The "LoadBalanceIncluded" field indicates whether the prioritized load balancing of the invention should be activated. The "ClassBlocked" field indicates which priority levels of the ATs should be restricted from reselecting to the neighboring radio access technologies. The "TimeBlocked" field indicates the period of time that the restriction of the reselection should last. The "NumEUTRAFrequencies" field indicates the number of neighboring radio access technologies. In this embodiment, the length of the "NumEUTRAFrequencies" field is one, since there is only one neighboring radio access technology, i.e. the second service network 122. Regarding the detailed description of the other fields in the "NeighborRAT" record, references may be made to the 3GPP2 specification of the 1×HRPD and LTE inter-working system.

Upon receiving the broadcast message from the first service network 121, the controller 112 determines whether the broadcast message comprises the load balancing information for the first service network 121 and the second service network 122. For example, the "LoadBalanceIncluded" field may be set to zero if the load balancing information is not included in the "NeighborRAT" record, and if otherwise, may be set to one, so that the controller 112 may determine whether the load balancing information is included in the broadcast message according to the "LoadBalanceIncluded" field. In response to the broadcast message comprising the load balancing information, the controller 112 further generates a random number, and determines whether the random number belongs to one of the restricted priority levels indicated in the "ClassBlocked" field of the load balancing information. Note that each set bit of the "ClassBlocked" field may correspond to a restricted priority level. For example, the first bit represents the priority level zero, the second bit represents the priority level one, and the third bit represents the priority level two, etc. Thus, the restricted priority levels may be determined by checking which bits of the "ClassBlocked" field are set, and the random number may be generated by randomly selecting an integer number from zero to nine. Subsequently, if the random number belongs to one of the restricted priority levels, the controller 112 suspends the reselection from the first service network 121 to the second service network 122. The time period for the suspension of reselection may be determined according to the "TimeBlocked" field. For example, the period of time may be set to $2^{TimeBlocked}$ seconds long. Before the period of time expires, the mobile communication device 110 stays serviced by the first service network 121 and does not perform the reselection procedure, including scanning for the cells in the second service network 122.

Latter on, when the period of time expires, the controller 112 may resume the reselection procedure by requesting that the wireless module 111 scans the cells in the second service network 122 according to the system information of the second service network 122 included in the broadcast message. One exemplary system information of the second service network 122 is shown in Table 2 below:

TABLE 2

The content of the "EARFCNList" record

| Field | Length (bits) |
|---|---|
| EARFCN | 16 |
| EUTRADuplexMode | 1 |
| EARFCNPriority | 0 or 3 |
| RxLevMinEUTRA | 0 or 7 |
| Threshold | 0 or 5 |
| MeasurementBandwidth | 0 or 3 |
| NumBlacklistPCI | 3 |

The "EARFCNList" record comprises information of the neighboring radio access technologies. Regarding the detailed description of the fields in the "EARFCNList" record, references may be made to the 3GPP2 specification of the 1×HRPD and LTE inter-working system. If a cell with better signal quality is scanned in the second service network 122, the controller 112 then determines to reselect from the first service network 121 to the second service network 122.

In addition, for the cases where the broadcast message does not comprise the load balancing information or the random number does not belong to the restricted priority levels, the mobile communication device 110 may perform the reselection procedure when necessary. That is, when the signal quality of the first service network 121 falls below a threshold value, the controller 112 may request that the wireless module 111 scans the cells in the second service network 122 according to the system information of the second service network indicated in the broadcast message. If a cell with better signal quality is scanned in the second service network 122, then the mobile communication device 110 may reselect from the first service network 121 to the second service network 122.

In another embodiment, instead of obtaining the restricted priority levels from the broadcast message, the mobile communication device 110 may choose to generate the restricted priority levels according to the International Mobile Equipment Identity (IMEI) of the mobile communication device 110, or the International Mobile Subscriber Identity (IMSI) or the subscriber priority level stored in the Subscriber Identity Module (SIM) card. Alternatively, the restricted priority levels may be generated by the mobile communication device 110 using a random function or other predetermined functions, when the mobile communication device 110 is powered on. In this embodiment, the controller 112 may keep detecting the signal quality of the data communication services received from the first service network 121, and determine whether the signal quality has fallen below a threshold value. In response to the signal quality falling below the threshold value, the controller 112 generates a random number and further determines whether the random number belongs to one of the generated restricted priority levels. If the random number belongs to one of the generated restricted priority levels, the controller 112 then suspends the reselection from the first service network 121 to the second service network 122. The period of time for the suspension of reselection may be set to an amount predetermined by the controller 112. For example, the controller 112 may generate another random number N, and set the period of time to $2^{TimeBlocked}$ seconds. Before the period of time expires, the mobile communication device 110 stays serviced by the first service network 121 and does not perform the reselection procedure, including scanning for the cells in the second service network 122.

Subsequently, when the period of time expires, the controller 112 may resume the reselection procedure by requesting that the wireless module 111 scans the cells in the second service network 122. If a cell with better signal quality is scanned in the second service network 122, the controller 112 then determines to reselect from the first service network 121 to the second service network 122. For the cases where the random number does not belonging to the restricted priority levels, the mobile communication device 110 may perform the reselection procedure when necessary. That is, when the signal quality of the first service network 121 falls below the above-mentioned threshold value, the controller 112 may request that the wireless module 111 scans the cells in the second service network 122. If a cell with better signal quality is scanned in the second service network 122, then the mobile communication device 110 may reselect from the first service network 121 to the second service network 122.

Figure 2:
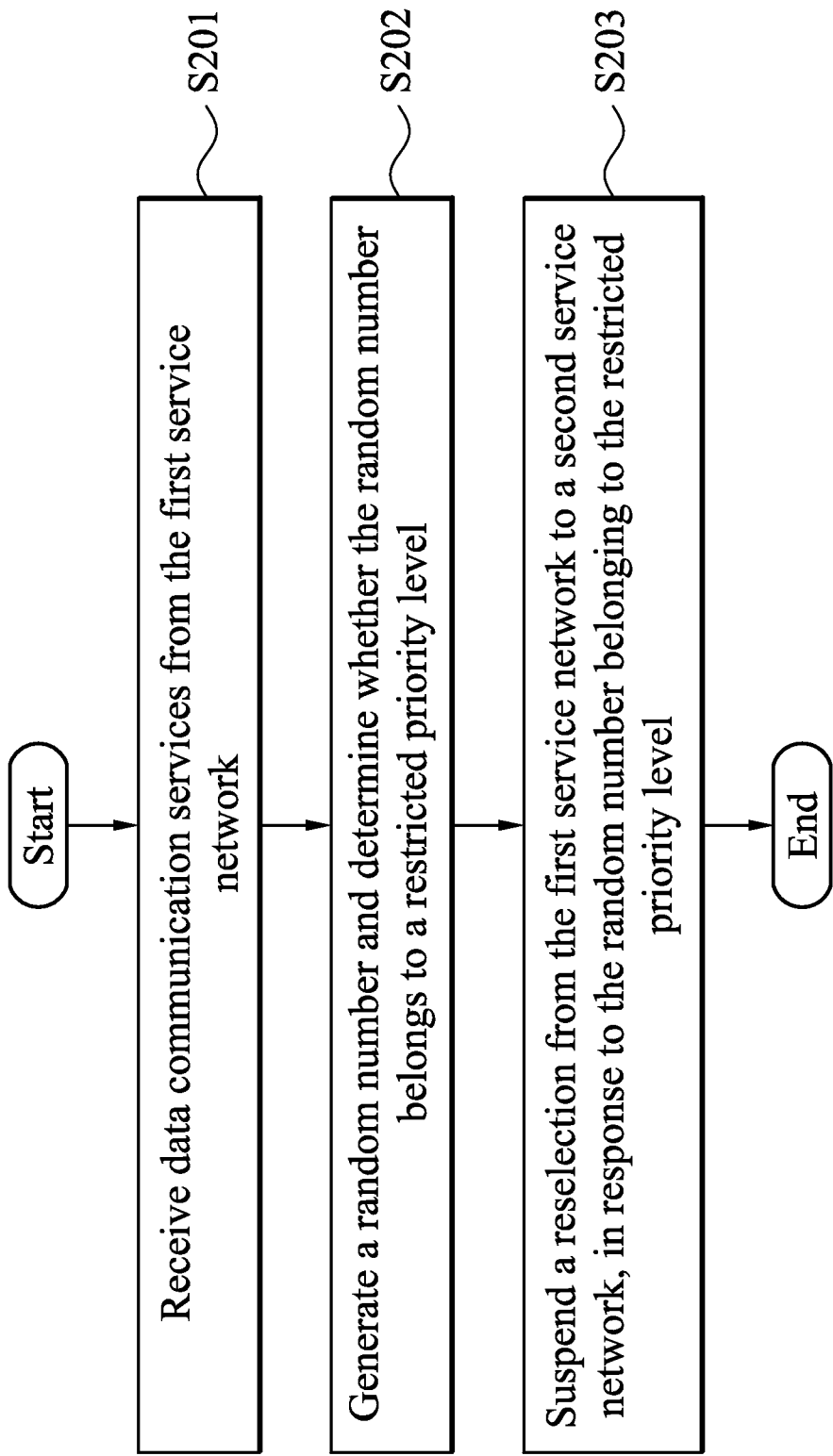
FIG. 2 is a flow chart of the prioritized load balancing method according to an embodiment of the invention.

FIG. 2 is a flow chart of the prioritized load balancing method according to an embodiment of the invention. The prioritized load balancing method is for a mobile communication device, such as the mobile communication device 110, originally connected to a first service network. Initially, the mobile communication device 110 receives data communication services from the first service network 121 (step S201). Subsequently, the mobile communication device 110 generates a random number and determines whether the random number belongs to a restricted priority level (step S202). Lastly, the mobile communication device 110 suspends a reselection from the first service network 121 to a second service network 122, in response to the random number belonging to the restricted priority level (step S203). Note that the restricted priority level may be generated by the mobile communication device 110 according to the IMEI of the mobile communication device 110, or the IMSI or the subscriber priority level stored in the SIM card coupled to the mobile communication device 110. Alternatively, the restricted priority level may be generated by the mobile communication device 110 using a random function or other predetermined functions, when the mobile communication device 110 is powered on. In other embodiments, the mobile communication device 110 may generate more than one restricted priority level.

Figure 3:
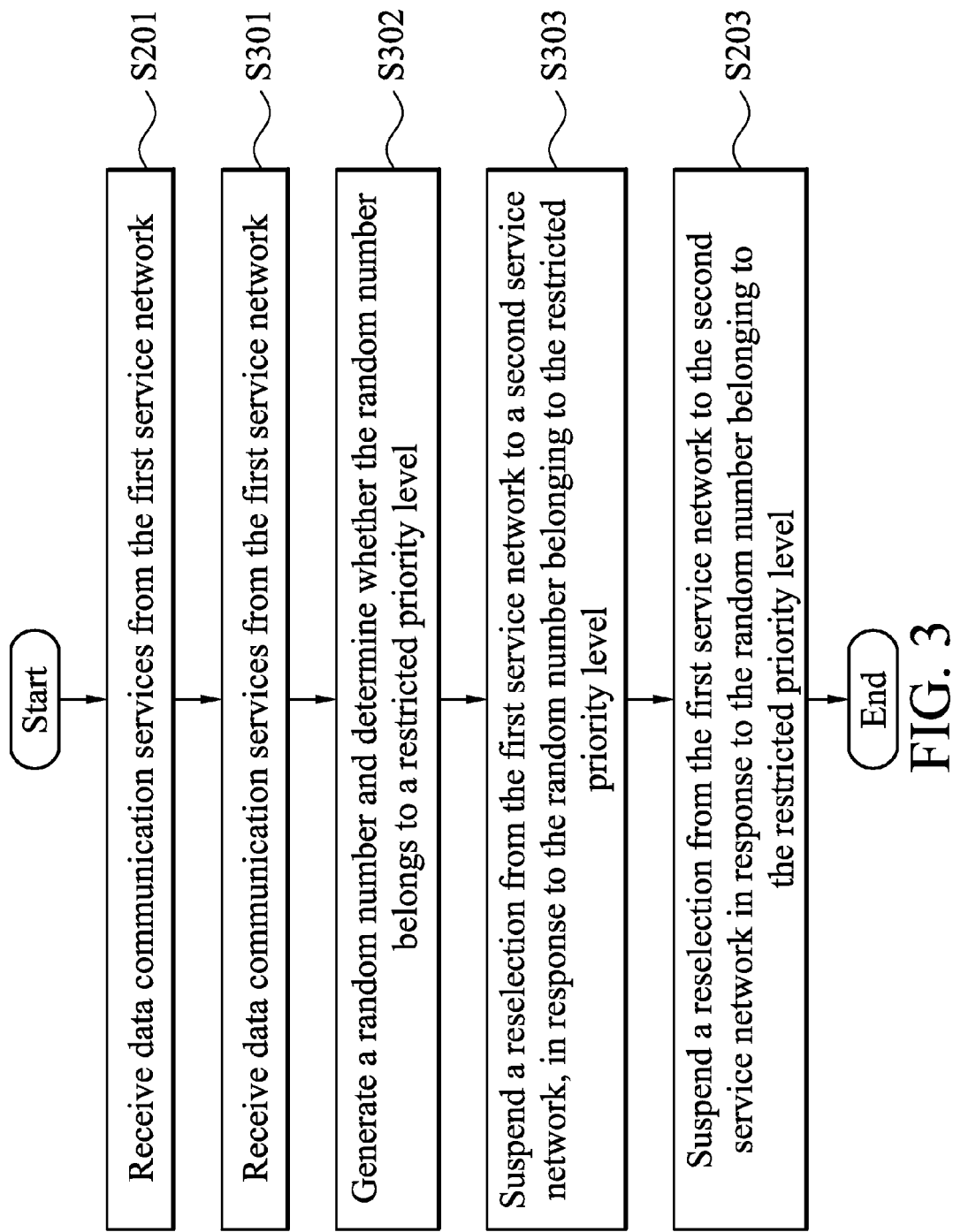
FIG. 3 is a flow chart of the prioritized load balancing method according to another embodiment of the invention.

FIG. 3 is a flow chart of the prioritized load balancing method according to another embodiment of the invention. Similar to FIG. 2, the mobile communication device 110 is initially connected to the first service network 121 for receiving data communication services (step S201). However, in this embodiment, the first service network 121 transmits a broadcast message, with load balancing information for the first service network 121 and the second service network 122 included within, to all user mobile devices (including the mobile communication device 110), when the system loading gets heavy (step S301). Regarding the content of the load balancing information, reference may be made to Table 1. After receiving the broadcast message, the mobile communication device 110 determines whether the broadcast message comprises the load balancing information (step S302). In response to the broadcast message comprising the load balancing information, the mobile communication device 110 generates a random number and determines whether the random number belongs to a restricted priority level according to the load balancing information (step S303). Subsequently, if the random number belongs to the restricted priority level, then the mobile communication device 110 suspends the reselection from the first service network 121 to the second service network 122 (step S203). The period of time for the suspension of reselection may be determined according to the "TimeBlocked" field indicated in the broadcast message. For example, the period of time may be set to $2^{TimeBlocked}$ seconds. Before the period of time expires, the mobile communication device 110 stays serviced by the first service network 121 and does not perform the reselection procedure, including scanning for the cells in the second service network 122.

Latter on, when the period of time expires, the mobile communication device 110 may resume the reselection procedure by scanning the cells in the second service network 122 according to the system information of the second service network 122 included in the broadcast message. If a cell with better signal quality is scanned in the second service network 122, the mobile communication device 110 then determines to reselect from the first service network 121 to the second service network 122. For the cases where the broadcast message does not comprise the load balancing information or the random number does not belong to the restricted priority level, the mobile communication device 110 may perform the reselection procedure when necessary. That is, when the signal quality of the first service network 121 falls below a threshold value, the mobile communication device 110 may scan the cells in the second service network 122 according to the system information of the second service network included in the broadcast message, and reselect from the first service network 121 to the second service network 122 if a cell with better signal quality is scanned in the second service network 122.

Figure 4:
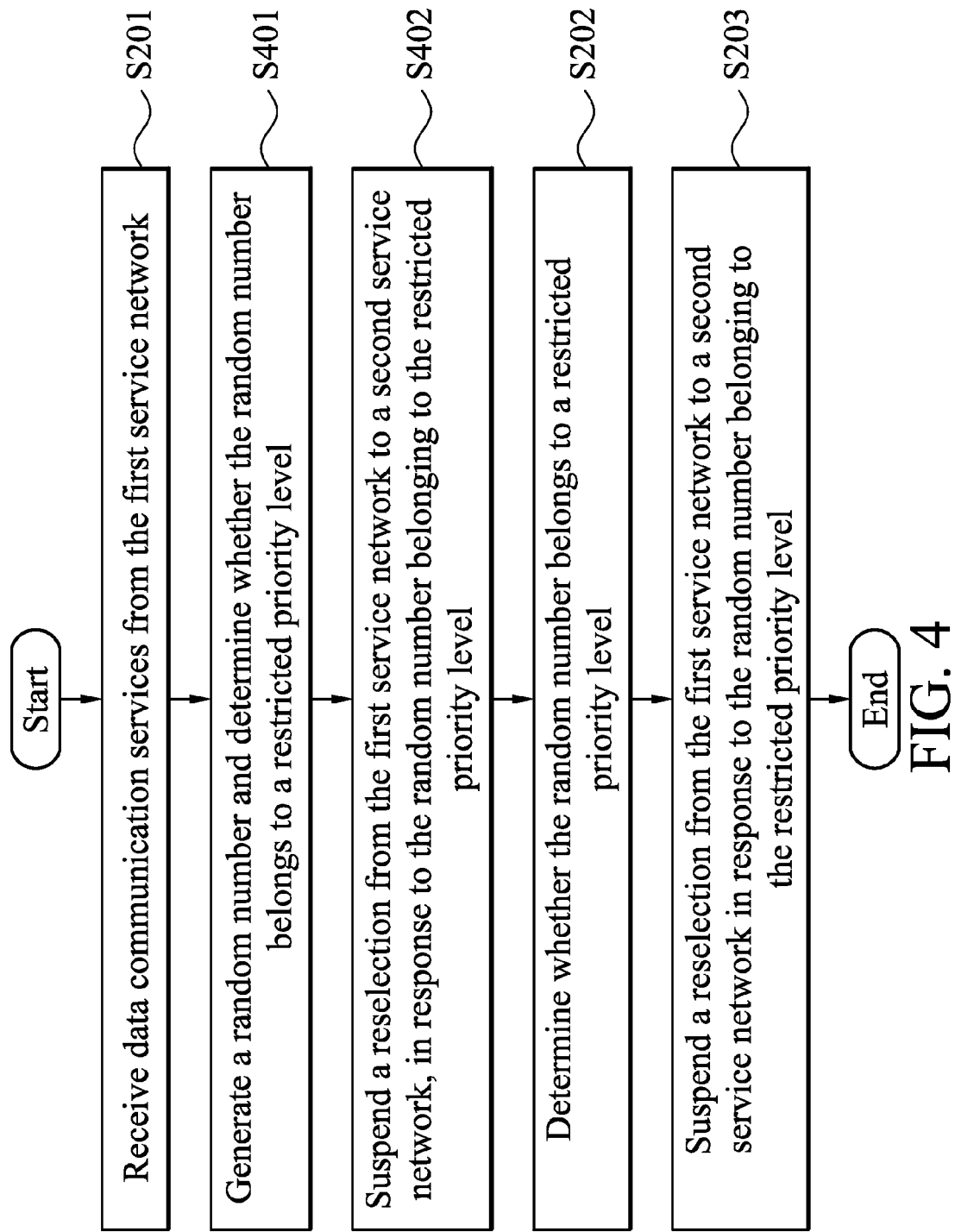
FIG. 4 is a flow chart of the prioritized load balancing method according to another embodiment of the invention.

FIG. 4 is a flow chart of the prioritized load balancing method according to another embodiment of the invention.

Similar to FIG. 2, the mobile communication device 110 is initially connected to the first service network 121 for receiving data communication services (step S201). However, in this embodiment, the mobile communication device 110 keeps detecting the signal quality of the data communication services from the first service network 121. To be more specific, the mobile communication device 110 determines whether the signal quality of the data communication services has fallen below a threshold value (step S401). In response to the signal quality of the data communication services falling below the threshold value, the mobile communication device 110 first generates a random number (step S402), and then determines whether the random number belongs to a restricted priority level (step S202). Subsequently, if the random number belongs to the restricted priority level, the mobile communication device 110 suspends the reselection from the first service network to a second service network (step S203). The period of time for the suspension of reselection may be set to an amount predetermined by the controller 112. For example, the controller 112 may generate another random number N, and set the period of time to $2^{TimeBlocked}$ seconds. Before the period of time expires, the mobile communication device 110 stays serviced by the first service network 121 and does not perform the reselection procedure, including scanning for the cells in the second service network 122.

Latter on, when the period of time expires, the mobile communication device 110 may resume the reselection procedure by scanning the cells in the second service network 122. If a cell with better signal quality is scanned in the second service network 122, the mobile communication device 110 then determines to reselect from the first service network 121 to the second service network 122. For the cases where the random number does not belong to the restricted priority level, the mobile communication device 110 may perform the reselection procedure when necessary. That is, when the signal quality of the first service network 121 falls below the above-mentioned threshold value, the mobile communication device 110 may scan the cells in the second service network 122. If a cell with better signal quality is scanned in the second service network 122, then the mobile communication device 110 may reselect from the first service network 121 to the second service network 122.

It is noted that by applying the prioritized load balancing method, the amount of ATs transferring from the first service network 121 to the second service network 122 may be controlled, so that the load balancing between the service networks may be achieved. Specially, the amount of ATs being transferred from the first service network 121 to the second service network 122 may be deliberately controlled by setting restricted priority levels included in the broadcast message, by the operators of the service network, or by setting the restricted priority levels generated by the ATs.

While the invention has been described by way of example and in terms of preferred embodiment, it is to be understood that the invention is not limited thereto. Those who are skilled in this technology can still make various alterations and modifications without departing from the scope and spirit of this invention. For example, the mobile communication device 110 may support more than two mobile communication technologies, and the mobile communication system 100 may comprise more than two service networks which are in compliance with different mobile communication technologies, respectively, such as the 1×CDMA 2000 technology (including RevA 1×HRPD, RevB 1×HRPD, RevC 1×HRPD, and RevD 1×HRPD technologies), Worldwide Interoperability for Microwave Access (WiMAX) technology, or Time Division-Synchronous Code Division Multiple Access (TD-SCDMA) technology, etc. In addition, the prioritized load balancing method may be applied to the evolutionary technologies of the 1×CDMA 2000 technology family other than 1×HRPD and LTE inter-working system, and future evolution technologies, WiMAX technology, and LTE technology, etc. Therefore, the scope of the invention shall be defined and protected by the following claims and their equivalents.

What is claimed is:

1. A mobile communication device for prioritized load balancing, comprising:
    a wireless module receiving data communication services from a first service network; and
    a controller generating a random number and determining whether the random number belongs to a restricted priority level, and suspending a reselection from the first service network to a second service network in response to the random number belonging to the restricted priority level.

2. The mobile communication device of claim 1, wherein the random number is generated in response to one of the following:
    determining that the wireless module has received a broadcast message and the broadcast message comprises load balancing information for the first service network and the second service network; and
    determining that a signal quality of the received data communication services has fallen below a threshold value.

3. The mobile communication device of claim 2, wherein the reselection from the first service network to the second service network is suspended for a period of time.

4. The mobile communication device of claim 3, wherein the broadcast message further comprises system information of the second service network, and the controller further resumes the reselection from the first service network to the second service network in response an expiry of the period of time.

5. The mobile communication device of claim 1, wherein the controller further performs the reselection from the first service network to the second service network in response to at least one of the following:
    the wireless module receiving a broadcast message comprising no load balancing information for the first service network and the second service network; and
    the random number not belonging to the restricted priority level.

6. The mobile communication device of claim 1, wherein the restricted priority level is generated according to one of the following:
    an International Mobile Equipment Identity (IMEI);
    an International Mobile Subscriber Identity (IMSI) stored in a Subscriber Identity Module (SIM) card coupled to the mobile communication device;
    a subscriber priority level stored in the SIM card; and
    a second random number generated by the mobile communication device.

7. A prioritized load balancing method for a mobile communication device connected to a first service network, comprising:
    receiving data communication services from the first service network;
    generating a random number and determining whether the random number belongs to a restricted priority level; and
    suspending a reselection from the first service network to a second service network, in response to the random number belonging to the restricted priority level.

8. The prioritized load balancing method of claim 7, wherein the random number is generated in response to one of the following:
  receiving a broadcast message and the broadcast message comprising load balancing information for the first service network and the second service network; and
  determining that a signal quality of the received data communication services has fallen below a threshold value.

9. The prioritized load balancing method of claim 8, wherein the reselection from the first service network to the second service network is suspended for a period of time.

10. The prioritized load balancing method of claim 9, wherein the broadcast message comprises system information of the second service network, and the prioritized load balancing method further comprises resuming the reselection from the first service network to the second service network, in response to an expiry of the period of time.

11. The prioritized load balancing method of claim 7, further comprising performing the reselection from the first service network to the second service network in response to at least one of the following:
  receiving a broadcast message comprising no load balancing information for the first service network and the second service network; and
  the random number not belonging to the restricted priority level.

12. The prioritized load balancing method of claim 7, wherein the restricted priority level is generated according to one of the following:
  an International Mobile Equipment Identity (IMEI);
  an International Mobile Subscriber Identity (IMSI) stored in a Subscriber Identity Module (SIM) card coupled to the mobile communication device;
  a subscriber priority level stored in the SIM card and;
  a second random number generated by the mobile communication device.

13. A mobile communication system for prioritized load balancing, comprising:
  a first service network providing data communication services according to a first communication protocol; and
  a mobile communication device receiving the data communication services from the first service network, generating a random number and determining whether the random number belongs to a restricted priority level, and suspending a reselection from the first service network to a second service network in compliance with a second communication protocol in response to the random number belonging to the restricted priority level.

14. The mobile communication system of claim 13, wherein the random number is generated in response to one of the following:
  the mobile communication device receiving a broadcast message and the broadcast message comprising load balancing information for the first service network and the second service network; and
  the mobile communication device determining that a signal quality of the received data communication services has fallen below a threshold value.

15. The mobile communication system of claim 14, wherein the reselection from the first service network to the second service network is suspended for a period of time.

16. The mobile communication system of claim 15, wherein the broadcast message comprises system information of the second service network, and the mobile communication device further resumes the reselection from the first service network to the second service network in response to an expiry of the period of time.

17. The mobile communication system of claim 13, wherein the mobile communication device further performs the reselection from the first service network to the second service network in response to at least one of the following:
  receiving a broadcast message comprising no load balancing information for the first service network and the second service network; and
  the random number not belonging to the restricted priority level.

18. The mobile communication system of claim 13, wherein the restricted priority level is generated according to one of the following:
  an International Mobile Equipment Identity (IMEI);
  an International Mobile Subscriber Identity (IMSI) stored in a Subscriber Identity Module (SIM) card coupled to the mobile communication device;
  a subscriber priority level stored in the SIM card; and
  a second random number generated when the mobile communication device is powered on.

* * * * *